United States Patent
Jang et al.

(10) Patent No.: US 11,073,963 B2
(45) Date of Patent: Jul. 27, 2021

(54) METHOD, ELECTRONIC APPARATUS AND COMPUTER READABLE RECORDING MEDIUM FOR DISPLAYING INFORMATION REGARDING USER'S POINT OF INTEREST

(71) Applicant: THINKWARE CORPORATION, Seongnam-si (KR)

(72) Inventors: Won Dal Jang, Seongnam-si (KR); Dong Jin Yoon, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 196 days.

(21) Appl. No.: 15/230,072

(22) Filed: Aug. 5, 2016

(65) Prior Publication Data
US 2017/0038925 A1 Feb. 9, 2017

(30) Foreign Application Priority Data

Aug. 6, 2015 (KR) .......................... 10-2015-0111310

(51) Int. Cl.
- G06F 3/048 (2013.01)
- G06F 3/0482 (2013.01)
- G01C 21/36 (2006.01)
- G06F 16/9537 (2019.01)
- G06F 3/0488 (2013.01)

(52) U.S. Cl.
CPC ....... *G06F 3/0482* (2013.01); *G01C 21/3664* (2013.01); *G01C 21/3673* (2013.01); *G01C 21/3679* (2013.01); *G06F 3/0488* (2013.01); *G06F 16/9537* (2019.01)

(58) Field of Classification Search
CPC ............ G06F 3/0488; G06F 17/30873; G06F 3/0482; G06F 16/9537; G01C 21/34; G01C 21/26; G01C 21/3682; G01C 21/3664; G01C 21/3673; G01C 21/3679
See application file for complete search history.

(56) References Cited

U.S. PATENT DOCUMENTS

| 2009/0327078 | A1* | 12/2009 | Ohazama | ........... G01C 21/3682 |
| | | | | 705/14.54 |
| 2011/0137907 | A1* | 6/2011 | Ikenoue | .................. G06F 16/29 |
| | | | | 707/740 |

(Continued)

FOREIGN PATENT DOCUMENTS

| CN | 101339033 A | 1/2009 |
| CN | 101777049 A | 7/2010 |

(Continued)

*Primary Examiner* — Haoshian Shih
(74) *Attorney, Agent, or Firm* — Westerman, Hattori, Daniels & Adrian, LLP

(57) ABSTRACT

There is provided a method for displaying information regarding a user's point of interest. The method includes displaying a UI screen including a first UI region in which the user's point of interest is displayed on a map as a location identifier, and a second UI region in which at least one object for the user's point of interest is displayed. Here, the user's point of interest may include at least one of a point which is previously searched by the user, a point to which the user previously visits, and a point that the user previously registers as the point of interest, and the object may express the information regarding the user's point of interest in relation to the location identifier in detail.

12 Claims, 11 Drawing Sheets

(56) References Cited

U.S. PATENT DOCUMENTS

| | | | |
|---|---|---|---|
| 2014/0082561 A1* | 3/2014 | Yu | G06F 3/0488 |
| | | | 715/835 |
| 2014/0244651 A1* | 8/2014 | Liu | G06F 17/30873 |
| | | | 707/740 |
| 2014/0278064 A1* | 9/2014 | Lee | G01C 21/34 |
| | | | 701/428 |
| 2015/0067598 A1* | 3/2015 | Yoo | G01C 21/3682 |
| | | | 715/815 |
| 2015/0233726 A1* | 8/2015 | Handa | G01C 21/3667 |
| | | | 701/533 |
| 2016/0116292 A1* | 4/2016 | An | G01C 21/26 |
| | | | 701/454 |

FOREIGN PATENT DOCUMENTS

| | | |
|---|---|---|
| CN | 102084352 A | 6/2011 |
| CN | 103218377 A | 7/2013 |
| CN | 103677533 A | 3/2014 |
| EP | 2581703 A1 | 4/2013 |

\* cited by examiner

METHOD, ELECTRONIC APPARATUS AND COMPUTER READABLE RECORDING MEDIUM FOR DISPLAYING INFORMATION REGARDING USER'S POINT OF INTEREST

CROSS-REFERENCE TO RELATED APPLICATION

This application claims the priority and benefit of Korean Patent Application No. 10-2015-0111310 filed on Aug. 6, 2015, with the Korean Intellectual Property Office, the disclosure of which is incorporated herein by reference.

BACKGROUND OF THE INVENTION

1. Field of the Invention

The present invention relates to a method, an electronic apparatus, and a computer readable recording medium for displaying information regarding a user's point of interest (POI).

2. Description of the Related Art

In general, a vehicle uses an electronic apparatus (e.g., a navigation system) in which a global positioning system (GPS) for confirming a current location or movement speed of the corresponding vehicle or determining a travel path thereof is mounted.

The electronic apparatus calculates a location based on a GPS signal, indicates a current location of a moving object to a user based on the calculated location, routes an optimal path to a desired destination, and guides the user while providing a variety of information associated with the path along the path.

When it is intended that a destination for a routing is to be input to the electronic apparatus, the user mainly uses a search menu. Examples of a method for searching for a destination include an address search, a phone number search, a name search, and the like. The address search refers to a method for searching a location using an address corresponding to the destination, the phone number search refers to a method for searching for the location using a phone number corresponding to the destination, and the name search refers to a method for searching for the location using a general name corresponding to the destination.

Further, in order to more simply search for the destination, a technology which enables a recent destination, a point registered as a favorite point, and the like to be searched has been disclosed.

However, in a situation in which a plurality of user's points of interest are set, in the case in which only approximate location information of the point of interest is remembered, in the case in which only an approximate time of point of registration of the point of interest is remembered, in the case in which only an approximate time of point of a visit to the point of interest is remembered, and in the case in which only the fact that the point of interest is a place to which often goes is remembered, according to the related art, there is no alternative, except for a method for searching for all items.

SUMMARY

An aspect of the present invention may provide a method, an electronic apparatus, and a computer readable recording medium for displaying information regarding a user point of interest (POI) based on at least one of a time reference and a space reference.

According to an aspect of the present invention, a method for displaying information regarding a user's point of interest may include: displaying a user interface (UI) screen including at least one object for the user's point of interest; receiving a scroll input of a user; and scrolling and displaying the UI screen so as to correspond to the received scroll input, wherein the object may express the information regarding the user's point of interest including at least one of a point which is previously searched by the user, a point to which the user previously visits, and a point that the user previously registers as the point of interest.

The displaying of the UI screen may include detecting at least one of time information, location information, attribute information, and name information regarding the user's point of interest, generating the object for each of the user's point of interests using the detected information, and generating the UI screen by sequentially arranging the generated object along a time order based on the detected time information, and the time information regarding the user's point of interest may include at least one of registration time information corresponding to a time at which the user previously registers as the point of interest, visit time information corresponding to a time to which the user previously visits, and search time information corresponding to a time at which the user previously searches for.

In the generating of the UI screen, the UI screen may be generated by positioning a time distinction object allowing objects of different time zones to be distinguished in an arrangement of the object.

The object may be expressed by reflecting the number of search times information regarding the user's point of interest.

The object may express at least one of an icon representing attribute of the point of interest, registration time information corresponding to a time at which the user previously registers as the point of interest, visit time information corresponding to a time at which the user previously visits, search time information corresponding to a time at which the user previously searches for, and name information of the user's point of interest.

The method may further include, if any one of the objects displayed on the UI screen is selected, displaying a UI screen including at least one of detailed information of the user's point of interest corresponding to the selected object, a location view menu, a path search menu, and a deletion menu.

According to another aspect of the present invention, a method for displaying information regarding a user's point of interest may include: displaying a user interface (UI) screen including a first UI region in which the user's point of interest is displayed on a map as a location identifier, and a second UI region in which at least one object for the user's point of interest is displayed, wherein the user's point of interest may include at least one of a point which is previously searched by a user, a point to which the user previously visits, and a point that the user previously registers as the point of interest, and the object may express the information regarding the user's point of interest in relation to the location identifier in detail.

The method may further include: when a search request of the user's point of interest is input, displaying a UI screen of an overall map; and selecting a specific administrative area among a plurality of administrative areas configuring the overall map, wherein the displaying of the UI screen may be performed after the selecting of the specific administrative area, and the first UI region may display the user's point of interest on the map corresponding to the selected specific administrative area as the location identifier.

The method may further include: generating the first UI region in which the user's point of interest is displayed on the map as the location identifier using location information regarding the user's point of interest; and generating the second UI region in which the object is sequentially arranged along a time order using time information regarding the user's point of interest, wherein the time information regarding the user's point of interest may include at least one of registration time information corresponding to a time which is previously registered by the user, visit time information corresponding to a time to which the user previously visits, and search time information corresponding to a time at which the user previously searches for.

The first UI region and the second UI region are distinguished into separate UI regions, such that a user input for any one UI region may not influence the other UI region.

When the user input for expansion or contraction is received in the first UI region, the first UI region may expand or contract and display the map, and when a scroll input of the user is received in the second UI region, the second UI region may scroll and display the object so as to correspond to the received scroll input.

The object and the location identifier may be expressed by reflecting the number of search times information regarding the user's point of interest.

According to another aspect of the present invention, an electronic apparatus may include: a display unit displaying a user interface (UI) screen including at least one object for the user's point of interest; an input unit receiving a scroll input of a user; and a controlling unit controlling the display unit to scroll and display the UI screen so as to correspond to the received scroll input, wherein the object may express the information regarding the user's point of interest including at least one of a point which is previously searched by the user, a point to which the user previously visits, and a point that the user previously registers as the point of interest.

The electronic apparatus may include a detecting unit detecting at least one of time information regarding the user's point of interest, location information, attribute information regarding the user's point of interest, and name information regarding the user's point of interest, and an image processing unit generating the object for each of the user's point of interests using the detected information, and generating the UI screen by sequentially arranging the generated object along a time order based on the detected time information, and the time information regarding the user's point of interest may include at least one of registration time information corresponding to a time which is previously registered by the user, visit time information corresponding to a time to which the user previously visits, and search time information corresponding to a time at which the user previously searches for.

The image processing unit may generate the UI screen by positioning a time distinction object allowing objects of different time zones to be distinguished in an arrangement of the object.

The object may be expressed by reflecting the number of search times information regarding the user's point of interest.

According to another aspect of the present invention, an electronic apparatus may include: a display unit displaying a screen; and a controlling unit controlling the display unit to display a user interface (UI) screen including a first UI region in which the user's point of interest is displayed on a map as a location identifier, and a second UI region in which at least one object for the user's point of interest is displayed, wherein the user's point of interest may include at least one of a point which is previously searched by a user, a point to which the user previously visits, and a point that the user previously registers as the point of interest, and the object may express the information regarding the user's point of interest in relation to the location identifier in detail.

The electronic apparatus may further include: an input unit receiving a user input manipulating the electronic apparatus, wherein the controlling unit may control the display unit to display a UI screen of an overall map when a search request of the user's point of interest is input through the input unit, and may control the display unit to display the UI screen when a specific administrative area among a plurality of administrative areas configuring the overall map is selected through the input unit, and the first UI region displays the user's point of interest on the map corresponding to the selected specific administrative area as the location identifier.

The controlling unit may generate the first UI region in which the user's point of interest is displayed on the map as the location identifier using location information regarding the user's point of interest; and generate the second UI region in which the object is sequentially arranged along a time order using time information regarding the user's point of interest, and the time information regarding the user's point of interest may include at least one of registration time information corresponding to a time which is previously registered by the user, visit time information corresponding to a time to which the user previously visits, and search time information corresponding to a time at which the user previously searches for.

The first UI region and the second UI region are distinguished into separate UI regions, such that a user input for any one UI region may not influence the other UI region.

When the user input for expansion or contraction is received in the first UI region, the first UI region may expand or contract and display the map, and when a scroll input of the user is received in the second UI region, the second UI region may scroll and display the object so as to correspond to the received scroll input.

The object and the location identifier may be expressed by reflecting the number of search times information regarding to the user's point of interest.

According to another aspect of the present invention, a computer readable recording medium having a program for executing a method for displaying information regarding a user's point of interest recorded thereon may be provided.

DETAILED DESCRIPTION

Figure 1:
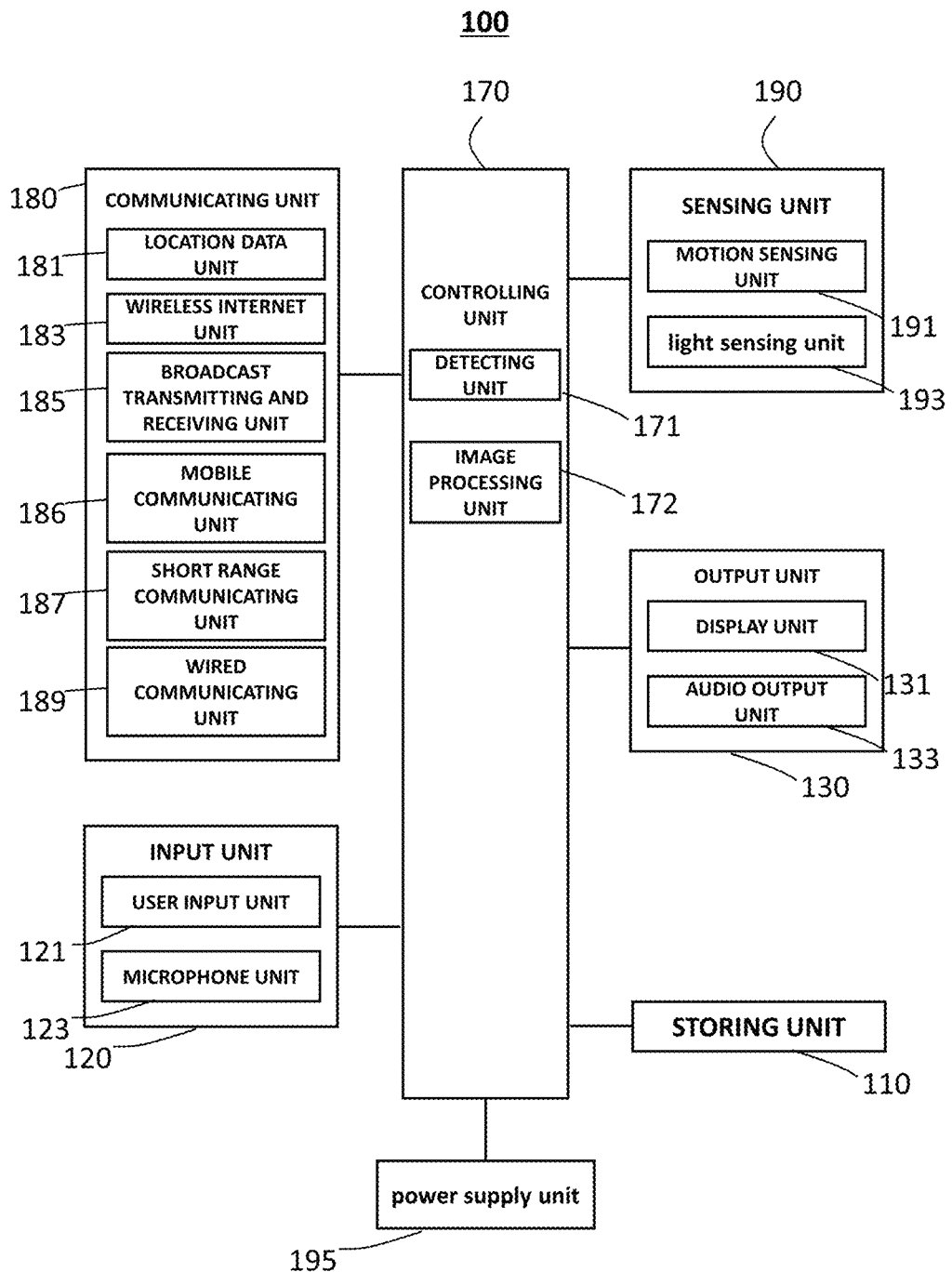
FIG. 1 is a block diagram illustrating an electronic apparatus according to an exemplary embodiment of the present invention.

The following description illustrates only a principle of the present invention. Therefore, those skilled in the art may implement the principle of the present invention and invent various apparatuses included in the spirit and scope of the present invention although not clearly described or illustrated in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices invented so as to perform the same function regardless of a structure.

Therefore it is to be understood that, for example, a block diagram of the present specification shows a conceptual aspect of an illustrative circuit for embodying a principle of the present invention. Similarly, it is to be understood that all flow charts, state transition diagrams, pseudo codes, and the like show various processes that may tangibly be embodied in a computer-readable medium and that are executed by computers or processors regardless of whether or the computers or the processors are clearly illustrated.

Functions of various devices including processors or functional blocks represented as concepts similar to the processors and illustrated in the accompanying drawings may be provided by hardware having capability to execute appropriate software as well as dedicated hardware. When the functions are provided by the processors, the above-mentioned functions may be provided by a single dedicated processor, a single shared processor, or a plurality of individual processors, in which some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods of performing functions including all types of software including, for example, a combination of circuit devices performing these functions, firmware/micro codes, or the like, and are coupled to appropriate circuits for executing the software so as to execute these functions. It is to be understood that since functions provided by variously mentioned means are combined with each other and are combined with a scheme demanded by the claims in the present invention defined by the claims, any means capable of providing these functions are equivalent to means recognized from the present specification.

The above-mentioned objects, features, and advantages will become more obvious from the following detailed description associated with the accompanying drawings. Therefore, those skilled in the art to which the present invention pertains may easily practice a technical idea of the present invention. Further, in describing the present invention, in the case in which it is judged that a detailed description of a well-known technology associated with the present invention may unnecessarily make the gist of the present invention unclear, it will be omitted.

Hereinafter, exemplary embodiments of the present invention will be described in detail with reference to the accompanying drawings.

FIG. 1 is a block diagram illustrating an electronic apparatus according to an exemplary embodiment of the present invention. Referring to FIG. 1, the electronic apparatus 100 includes all or some of a storing unit 110, an input unit 120, an output unit 130, a controlling unit 170, a communicating unit 180, a sensing unit 190, and a power supply unit 195.

Here, the electronic apparatus 100 may be implemented in various apparatuses such as a smartphone, a tablet computer, a notebook computer, a personal digital assistant (PDA), a portable multimedia player (PMP), a smart glass, a project glass, a navigation, a car video recorder, and the like that may provide a driving related guidance to a driver of a vehicle which is being driven.

The driving related guidance may include a variety of guidance for assisting the driving of the driver of the vehicle, such as a path guidance, a lane departure guidance, a front vehicle starting guidance, a traffic light change guidance, a front vehicle collision prevention guidance, a road change guidance, a road guidance, and the like.

Here, the path guidance may include an augmented reality path guidance that performs the path guidance by coupling a variety of information such as a location, a direction, and the like of the user to an image obtained by photographing a front of the vehicle which is being driven, and a 2-dimensional (2D) or 3-dimensional (3D) path guidance that performs the path guidance by coupling a variety of information such as the location, the direction, and the like of the user to 2D or 3D map data. As well, the path guidance may include an aerial map path guidance that performs the path guidance by coupling a variety of information such as the location, the direction, and the like of the user to aerial map data.

Here, the path guidance may be construed as a concept including the path guidance when the user moves while walking or running, as well as when the user drives the vehicle on board.

When a destination for a routing is input from the user, the electronic apparatus 100 may perform the above-mentioned path guidance by calculating a current location of the electronic apparatus 100 based on a GPS signal, routing an optimal path to the destination using the calculated current location and the input destination, and providing a variety of information related to the optimal path.

Here, the input of the destination may be performed by a destination search such as an address search that searches for the destination using an address corresponding to the destination, a phone number search that searches for the destination using a phone number corresponding to the destination, a name search that searches for the destination using a general name corresponding to the destination, and the like.

Alternatively, according to an exemplary embodiment of the present invention, when a user's point of interest search instruction is input, the electronic apparatus 100 may display a user interface (UI) screen on which information regarding a user's point of interest is classified by at least one of a time reference and a space reference and is displayed. In this case, the input of the destination may be performed by selecting the user's point of interest on the corresponding UI screen.

Meanwhile, the lane departure guidance may refer to guiding whether or not the vehicle which is being driven departs the lane.

In addition, the front vehicle starting guidance may refer to guiding whether or not a vehicle located at the front of a vehicle which is being stopped starts.

In addition, the traffic light change guidance may refer to guiding whether or not a traffic light located at the front of the vehicle which is being stopped is changed. As one example, the traffic light change guidance may refer to guiding a case in which the traffic light is changed from a state in which a red light indicating a stop signal is turned on to a green light indicating a start signal.

In addition, the front vehicle collision prevention guidance may refer to guiding that a distance between the vehicle which is being stopped or driven and the vehicle located at the front thereof becomes within a predetermined distance, in order to prevent a collision with the front vehicle when the distance between the vehicle which is being stopped or driven and the vehicle located at the front thereof becomes within the predetermined distance.

In addition, the road change guidance may refer to guiding a change of a road from a road on which the vehicle is located to another road for the path guidance up to the destination.

In addition, the road guidance may refer to guiding a road on which the vehicle is currently located.

A front image of the vehicle enabling the provision of the variety of guidance described above may be photographed by a camera held on the vehicle. Here, the camera may be formed integrally with the electronic apparatus 100 held on the vehicle to photograph the front of the vehicle.

As another example, the camera may be held on the vehicle separately from the electronic apparatus 100 to photograph the front of the vehicle. In this case, the camera may be a separate car video recorder held toward the front of the vehicle, the electronic apparatus 100 may receive the photographed image via wired/wireless communications with the car video recorder held separately from the electronic apparatus 100, or when a storage medium storing the photographed image of the car video recorder is inserted into the electronic apparatus 100, the electronic apparatus 100 may receive the photographed image.

Hereinafter, the electronic apparatus 100 according to an exemplary embodiment of the present invention will be described in more detail based on the description described above.

The storing unit 110 serves to store a variety of data and applications necessary to operate the electronic apparatus 100. Specifically, the storing unit 110 may store the data necessary to operate the electronic apparatus 100, for example, an operating system, a path search application, map data, and the like. In addition, the storing unit 110 may store the data generated by the operation of the electronic apparatus 100, for example, searched path data, a received image, and the like.

In addition, the storing unit 110 may store information regarding a user's point of interest. Here, the user's point of interest may include at least one of a point which is previously searched by the user, a point to which the user previously visits, and a point that the user previously registers as the point of interest. In addition, a previous point of time may mean a past point of time based on a point of time at which the electronic apparatus 100 receives a user's point of interest search instruction.

Therefore, the point which is previously searched by the user may mean a destination which is previously searched by the user through the address search, the phone number search, the name search, and the like. In addition, the point to which the user previously visits may mean a destination to which the user previously and actually visits among the searched destinations. In addition, the point that the user previously registers as the point of interest may mean a destination that the user previously registers as a favorite point.

Meanwhile, the information regarding the user's point of interest stored in the storing unit 110 may be detected as at least one of time information representing time regarding the user's point of interest, location information representing a location regarding the user's point of interest, attribute information representing attributes regarding the user's point of interest (e.g., characteristics of points such as a petrol station, a restaurant, a museum, a housing facility, and the like), name information representing a general name regarding the user's point of interest, and the number of search times information representing the number of times searching for the user's point of interest through various search methods.

The time information regarding the user's point of interest may include at least one of registration time information corresponding to a time at which the user previously registers as the point of interest, visit time information corresponding to a time at which the user previously visits, and search time information corresponding to a time at which the user previously searches for.

The storing unit 110 may be implemented as an embedded type of storage element such as random access memory (RAM), a flash memory, a read only memory (ROM), an erasable programmable ROM (EPROM), an electrically erasable and programmable ROM (EEPROM), a register, a hard disk, a removable disk, a memory card, a universal subscriber identity module (USIM), or the like, as well as a removable type of storage element such as a USB memory, or the like.

The input unit 120 serves to convert a physical input from the outside of the electronic apparatus 100 into a specific electrical signal. Here, the input unit 120 may include all or some of a user input unit 121 and a microphone unit 123.

The user input unit 121 may receive a user input such as a touch, a push operation, or the like. Here, the user input unit 121 may be implemented using at least one of a form of various buttons, a touch sensor receiving a touch input, and a proximity sensor receiving an approaching motion.

The microphone unit 123 may receive voice of the user and sound generated from inside and outside of a vehicle.

The output unit 130 is an apparatus that outputs the data of the electronic apparatus 100. Here, the output unit 130 may include all or some of a display unit 131 and an audio output unit 133.

The display unit 131 is an apparatus that outputs the data which may be visually recognized by the electronic apparatus 100. The display unit 131 may be implemented as the display unit provided to a front surface of a housing of the electronic apparatus 100. In addition, the display unit 131 may be formed integrally with the electronic apparatus 100 to output visual recognition data, and may also be installed separately from the electronic apparatus 100 such as a head up display (HUD) to output the visual recognition data.

The audio output unit 133 is an apparatus that outputs data which may be acoustically recognized by the electronic apparatus 100. The audio output unit 133 may be implemented as a speaker that represents data to be informed to the user of the electronic apparatus 100 as sound.

The communicating unit 180 may be provided so that the electronic apparatus 100 communicates with other devices. The communicating unit 180 may include all or some of a location data unit 181, a wireless internet unit 183, a broadcast transmitting and receiving unit 185, a mobile communicating unit 186, a short range communicating unit 187, and a wired communicating unit 189.

The location data unit 181 is an apparatus that obtains location data through a global navigation satellite system (GNSS). The GNSS means a navigation system capable of calculating a location of a receiving terminal using a radio signal received from a satellite. Detailed examples of the GNSS may include a global positioning system (GPS), Galileo, a global orbiting navigational satellite system (GNONASS), COMPASS, an Indian regional navigational satellite system (IRNSS), a quasi-zenith satellite system (QZSS), and the like, depending on an operator thereof. The location data unit 181 of the electronic apparatus 100 according to an exemplary embodiment of the present invention may obtain location data by receiving a GNSS signal serviced in an area in which the electronic apparatus 100 is used.

The wireless internet unit 183 is an apparatus connected to wireless Internet to obtain or transmit data. Examples of wireless Internet which may be connected through the wireless internet unit 183 may include a wireless LAN (WLAN), a wireless broadband (Wibro), a world interoperability for microwave access (Wimax), a high speed downlink packet access (HSDPA), and the like.

The broadcast transmitting and receiving unit 185 is an apparatus that transmits and receives a broadcast signal through a variety of broadcast systems. Examples of the broadcast systems which may be transmitted and received through the broadcast transmitting and receiving unit 185 may include digital multimedia broadcasting terrestrial (DMBT), digital multimedia broadcasting satellite (DMBS), media forward link only (MediaFLO), digital video broadcast handheld (DVBH), integrated services digital broadcast terrestrial (ISDBT), and the like. The broadcast signals transmitted and received through the broadcast transmitting and receiving unit 185 may include traffic data, living data, and the like.

The mobile communicating unit 186 may be connected to a mobile communication network according to various mobile communication standards such as 3rd generation (3G), 3rd generation partnership project (3GPP), Long Term Evolution (LTE), and the like to perform communications.

The short range communicating unit 187 is an apparatus for short range communications. The short range communicating unit 187 may communicate through Bluetooth, radio frequency identification (RFID), infrared data association (IrDA), ultra wideband (UWB), ZigBee, near field communication (NFC), a wireless-fidelity (WiFi), or the like, as described above.

The wired communicating unit 189 is an interface apparatus capable of connecting the electronic apparatus 100 to other devices by wire. The wired communicating unit 189 may be a USB module capable of performing communication through a USB port.

The above-mentioned communicating unit 180 may communicate with other devices using at least one of the location data unit 181, the wireless internet unit 183, the broadcast transmitting and receiving unit 185, the mobile communicating unit 186, the short range communicating unit 187, and the wired communicating unit 189.

As an example, in the case in which the electronic apparatus 100 does not include a camera function, the electronic apparatus 100 may receive an image photographed by a camera for a vehicle such as a car video recorder, using at least one of the short range communicating unit 187 and the wired communicating unit 189.

As another example, in the case in which the electronic apparatus 100 communicates with a plurality of devices, any one of the plurality of devices may communicate with the electronic apparatus 100 through the short range communicating unit 187, and the other may communicate with the electronic apparatus 100 through the wired communicating unit 189.

The sensing unit 190 is an apparatus capable of sensing a current state of the electronic apparatus 100. The sensing unit 190 may include all or some of a motion sensing unit 191 and a light sensing unit 193.

The motion sensing unit 191 may sense a motion of the electronic apparatus 100 on a 3 dimensional space. The motion sensing unit 191 may include a tri-axis geomagnetic sensor and a tri-axis acceleration sensor. A more accurate trajectory of the vehicle to which the electronic apparatus 100 is attached may be calculated by coupling kinetic data obtained by the motion sensing unit 191 to location data obtained by the location data unit 181.

The light sensing unit 193 is an apparatus that measures ambient illuminance of the electronic apparatus 100. A brightness of the display unit 131 may be changed so as to correspond to an ambient brightness, using illuminance data obtained by the light sensing unit 193.

The power supply unit 195 is an apparatus that supplies power necessary to operate the electronic apparatus 100 or operate other devices connected to the electronic apparatus 100. The power supply unit 195 may be an apparatus that receives power from a battery embedded in the electronic apparatus 100 or an external power supply such as a vehicle. In addition, the power supply unit 195 may be implemented as a wired communicating module 119, or may also be implemented as an apparatus that wirelessly receives the power, depending on a form receiving the power.

The controlling unit 170 includes a detecting unit 171 and an image processing unit 172, and controls a general operation of the electronic apparatus 100. Specifically, the controlling unit 170 may control all or some of the storing unit 110, the input unit 120, the output unit 130, the communicating unit 180, the sensing unit 190, and the power supply unit 195.

In particular, when a search request on the user's point of interest is input through the input unit 120, the controlling unit 170 may control the display unit 131 so that the information regarding the user's point of interest is displayed being classified by at least one of a time reference and a space reference.

More specifically, according to the first exemplary embodiment of the present invention, the controlling unit 170 may control the display unit 131 so that the information regarding the user's point of interest is displayed being classified by the time reference. In this case, the controlling unit 170 may control configurations of the electronic apparatus 100 to be operated as follows.

First, when the search request on the user's point of interest is input through the input unit 120, the controlling unit 170 may control the display unit 131 so as to display a user interface (UI) screen including at least one object for the user's point of interest.

More specifically, when the search request on the user's point of interest is received through the input unit 120, the detecting unit 171 may detect at least one of the time information regarding the user's point of interest, the location information regarding the user's point of interest, the attribute information regarding the user's point of interest, the name information regarding the user's point of interest, and the number of search times information regarding the user's point of interest.

In addition, the image processing unit 172 may generate an object for each of the user's points of interest using the detected information. Specifically, the image processing unit 172 may generate objects expressing an icon representing an attribute of the point of interest, the registration time information corresponding to the time at which the user previously registers as the point of interest, the visit time information corresponding to the time at which the user previously visits, the search time information corresponding to the time at which the user previously searches for, the name information of the user's point of interest, and the number of search times information regarding the point of interest using the detected information. Here, the generated objects may include at least one of a text, an image, an audio, and a video.

In addition, the image processing unit 172 may sequentially arrange the generated objects along a time order based on the detected time information to thereby generate the UI screen. In addition, the display unit 131 may display the generated UI screen.

Meanwhile, when a scroll input of the user is received through the input unit 120, the controlling unit 170 may control the display unit 131 to scroll and display the UI screen so as to correspond to the received scroll input.

In addition, in the method for displaying information regarding a user's point of interest according to the second exemplary embodiment of the present invention, the controlling unit 170 may control the display unit 131 so that the information regarding the user's point of interest is displayed being classified by the time reference and the space reference.

"In this case, the controlling unit 170 may control configurations of the electronic apparatus 100 to be operated as follows.

First, when the search request on the user's point of interest is received through the input unit 120, the controlling unit 170 may control the display unit 131 so as to display a user interface (UI) screen including a first user interface (UI) region in which the user's point of interest is displayed on a map as a location identifier, and a second UI region in which at least one object for the user's point of interest is displayed.

More specifically, when the search request on the user's point of interest is received through the input unit 120, the detecting unit 171 may detect at least one of the time information regarding the user's point of interest, the location information regarding the user's point of interest, the attribute information regarding the user's point of interest, the name information regarding the user's point of interest, and the number of search times information regarding the user's point of interest.

In addition, the image processing unit 172 may generate the first UI region in which the user's point of interest is displayed on the map as the location identifier using the location information regarding the user's point of interest. In addition, the image processing unit 172 may generate the second UI region in which the objects are sequentially arranged along a time order using the time information regarding the user's point of interest. In addition, the image processing unit 172 may generate a UI screen on which the generated first UI region and second UI region are simultaneously displayed. In addition, the display unit 131 may display the generated UI screen.

Here, the object displayed in the second UI region may express in detail the information regarding the user's point of interest in comparison with the location identifier displayed in the first UI region. For example, the location identifier may be expressed as a point representing the corresponding location on the map, and the object may express schematic information such as the time information regarding the point of interest, the name information regarding the point of interest, and the like.

Meanwhile, when one point of interest of a plurality of user's points of interest is selected through the UI screen displayed according to the method for displaying information regarding a user's point of interest described above, the controlling unit 170 may calculate an optimal path to a destination using a current location and the destination corresponding to the user's point of interest, and may perform a path guidance based on the calculated optimal path.

Figure 2:
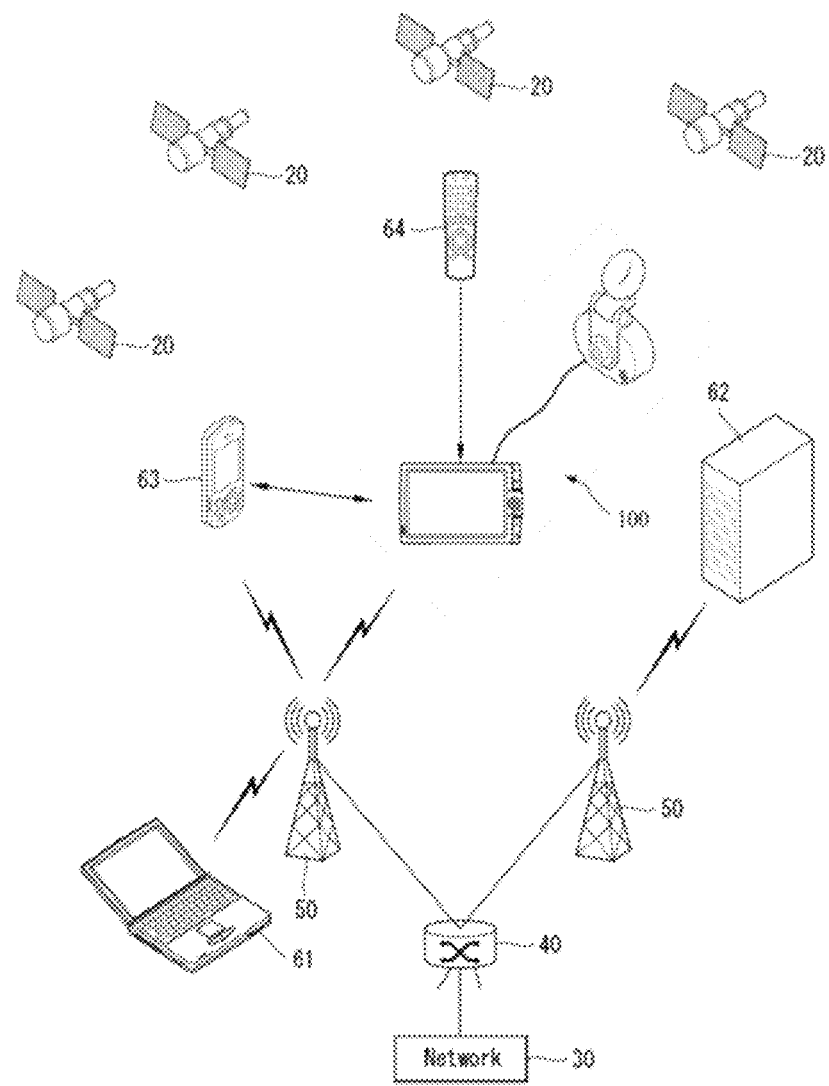
FIG. 2 is a diagram illustrating a system network connected to the electronic apparatus according to an exemplary embodiment of the present invention.

FIG. 2 is a diagram illustrating a system network connected to the electronic apparatus according to an exemplary embodiment of the present invention. Referring to FIG. 2, the electronic apparatus 100 according to an exemplary embodiment of the present invention may be implemented as a variety of apparatuses included in the vehicle such as a navigation, a car video recorder, a smartphone, other apparatuses for providing an augmented reality interface for a vehicle, and the like, and may be connected to various communication networks and other electronic devices 61 to 64.

In addition, the electronic apparatus 100 may be interworked with the GPS module according to radio signals received from satellites 20 to calculate a current location and a current time zone.

The respective satellites 20 may transmit L-band frequencies having different frequency bands. The electronic apparatus 100 may calculate the current location based on times that the L-band frequencies transmitted from the respective satellites 20 take to arrive at the electronic apparatus 100.

Meanwhile, the electronic apparatus 100 may be wirelessly connected to a controller station 40 (ACR) through the communicating unit 180 and to a network (30) through a base station 50 (RAS). When the electronic apparatus 100 is connected to the network 30, the electronic apparatus 100 may be indirectly connected to other electronic devices 61 and 62 connected to the network 30 to exchange data.

Meanwhile, the electronic apparatus 100 may also be indirectly connected to the network 30 through another device 63 having a communication function. For example, in the case in which the electronic apparatus 100 does not include a module capable of being connected to the network 30, the electronic apparatus 100 may communicate with another device 63 having the communication function through a short range communication module, or the like.

Figure 3:
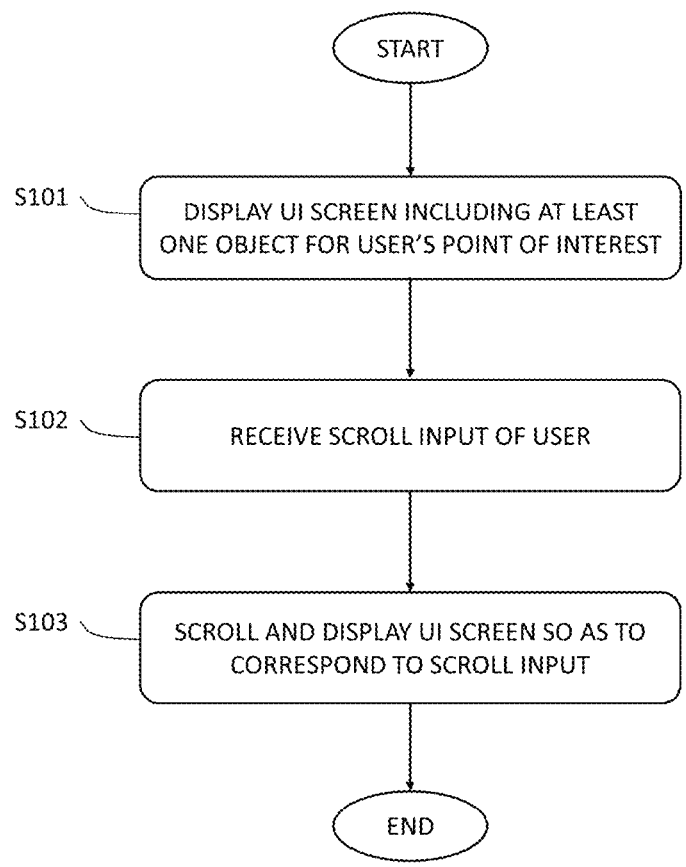
FIG. 3 is a flow chart illustrating a method for displaying a user interface (UI) screen according to a first exemplary embodiment of the present invention.

FIG. 3 is a flow chart illustrating a method for displaying a user interface (UI) screen according to a first exemplary embodiment of the present invention. Referring to FIG. 3, first, the electronic apparatus 100 may display a user interface (UI) screen including at least one object for a user's point of interest (S101). Here, the user's point of interest may include at least one of a point which is previously searched by the user, a point to which the user previously visits, and a point that the user previously registers as the point of interest. In addition, an object may express information regarding the user's point of interest, for example, name information regarding the point of interest, time information regarding the point of interest, and the like.

Next, the electronic apparatus 100 may receive a scroll input of the user (S102). As an example, the scroll input may be a touch input that performs a drag from one point on a touch screen to another point.

Next, the electronic apparatus 100 may scroll and display the UI screen so as to correspond to the received scroll input (S103).

Figure 4:
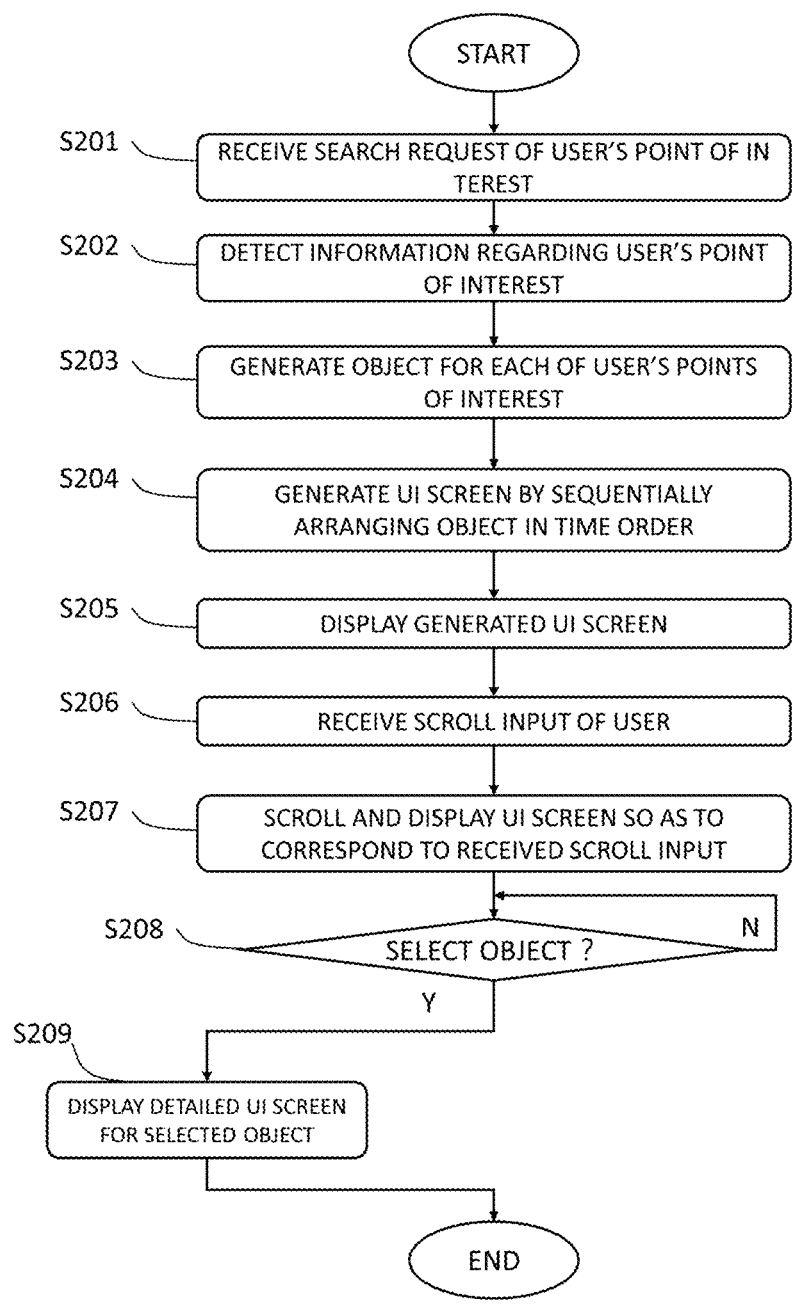
FIG. 4 is a diagram illustrating the method for displaying a user interface (UI) screen according to the first exemplary embodiment of the present invention in more detail.

FIG. 4 is a diagram illustrating the method for displaying a user interface (UI) screen according to the first exemplary embodiment of the present invention in more detail. Referring to FIG. 4, first, the electronic apparatus 100 may receive a search request of a user's point of interest (S201). Specifically, the display unit 131 may display an address search menu, a phone number search menu, a name search menu, and a user's point of interest search menu for a destination search. If the user selects the 'user's point of interest search menu' among a plurality of displayed menus, the S201 may be performed.

Next, the electronic apparatus 100 may detect information regarding the user's point of interest (S202). Specifically, the detecting unit 171 may detect at least one of time information regarding the user's point of interest, location information regarding the user's point of interest, attribute information regarding the user's point of interest, name information regarding the user's point of interest, and the number of search times information regarding the user's point of interest which are stored in the storing unit 110.

Next, the electronic apparatus 100 may generate an object for each of the user's points of interest using the detected information (S203). Specifically, the image processing unit 172 may generate objects expressing an icon representing an attribute of the point of interest, the registration time information corresponding to the time at which the user previously registers as the point of interest, the visit time information corresponding to the time at which the user previously visits, the search time information corresponding to the time at which the user previously searches for, the name information of the user's point of interest, and the number of search times information regarding the point of interest using the detected information. Here, the generated objects may include at least one of a text, an image, an audio, and a video.

Next, the electronic apparatus 100 may sequentially arrange the generated objects along a time order based on the time information to thereby generate the UI screen (S204). As an example, the image processing unit 172 may generate the UI screen by disposing the predetermined number of objects corresponding to the latest user's point of interest in a first row, and arranging the objects so that the older object is disposed as the object is apart from the first row (in other words, as the number of row is increased).

Figure 5A:
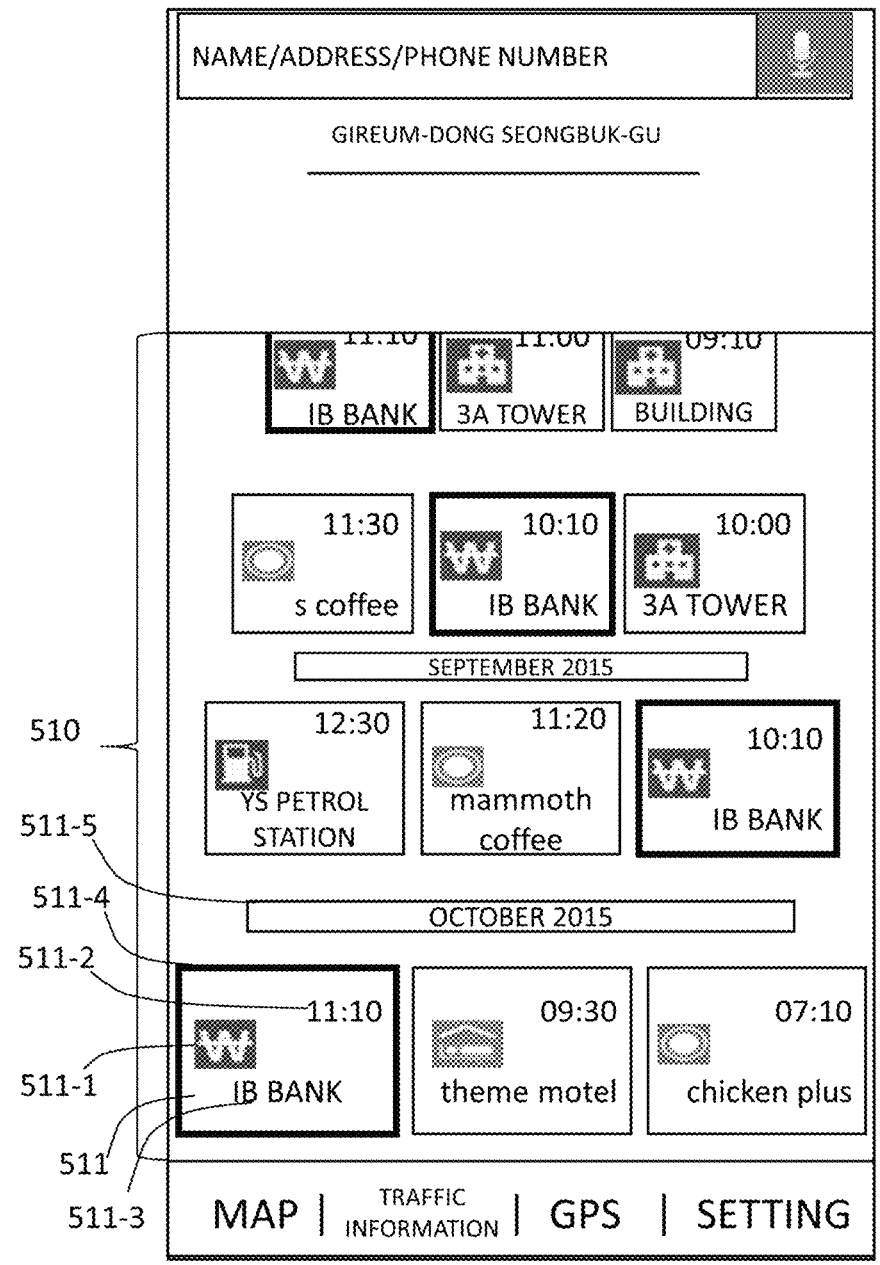
FIGS. 5A to 5C are diagrams illustrating the UI screen according to the first exemplary embodiment of the present invention.

Next, the electronic apparatus 100 may display the generated UI screen (S205). In this case, the generated UI screen may be displayed as in FIG. 5A. That is, the UI screen may sequentially arrange and display a plurality of objects 510 for the user's point of interest along the time order.

In addition, the respective objects 511 may express an icon 511-1 representing an attribute of the point of interest, time information 511-2 representing search/visit/registration time of the point of interest, and name information 511-3 of the point of interest.

In addition, the respective objects 511 may express the number of search times information regarding the point of interest. As an example, the number of search times information regarding the point of interest may be expressed by forming an edge having a predetermined thickness around a circumference of the object 511-1 of which the number of search times regarding the point of interest is within the top X %. In addition, although not illustrated in FIG. 5A, the number of search times information may be expressed by forming a color of the edge 511-4 having the predetermined thickness formed around the circumference of the object 511 to be different.

In addition, the UI screen may display a time distinction object 511-5 allowing objects of different time zones to be distinguished. This may be performed by positioning the time distinction object allowing the image processing unit 172 to distinguish the objects of the different time zones in an arrangement of the objects to thereby generate the UI screen.

Meanwhile, next, the electronic apparatus 100 may receive the scroll input of the user (S206). Specifically, when a touch input that performs a drag from one point on a touch screen to another point is input through the input unit 120, the controlling unit 170 may judge that the scroll input is received, and may determine a direction of the scroll input. Here, the direction of the scroll input may include a left direction, a right direction, an upward direction, and a downward direction.

Next, the electronic apparatus 100 may scroll and display the UI screen so as to correspond to the received scroll input (S207). Specifically, the electronic apparatus 100 may scroll and display the UI screen in a direction corresponding to the direction of the scroll input. As an example, the electronic apparatus 100 may display the UI screen as in FIGS. 5B and 5C.

Figure 5B:
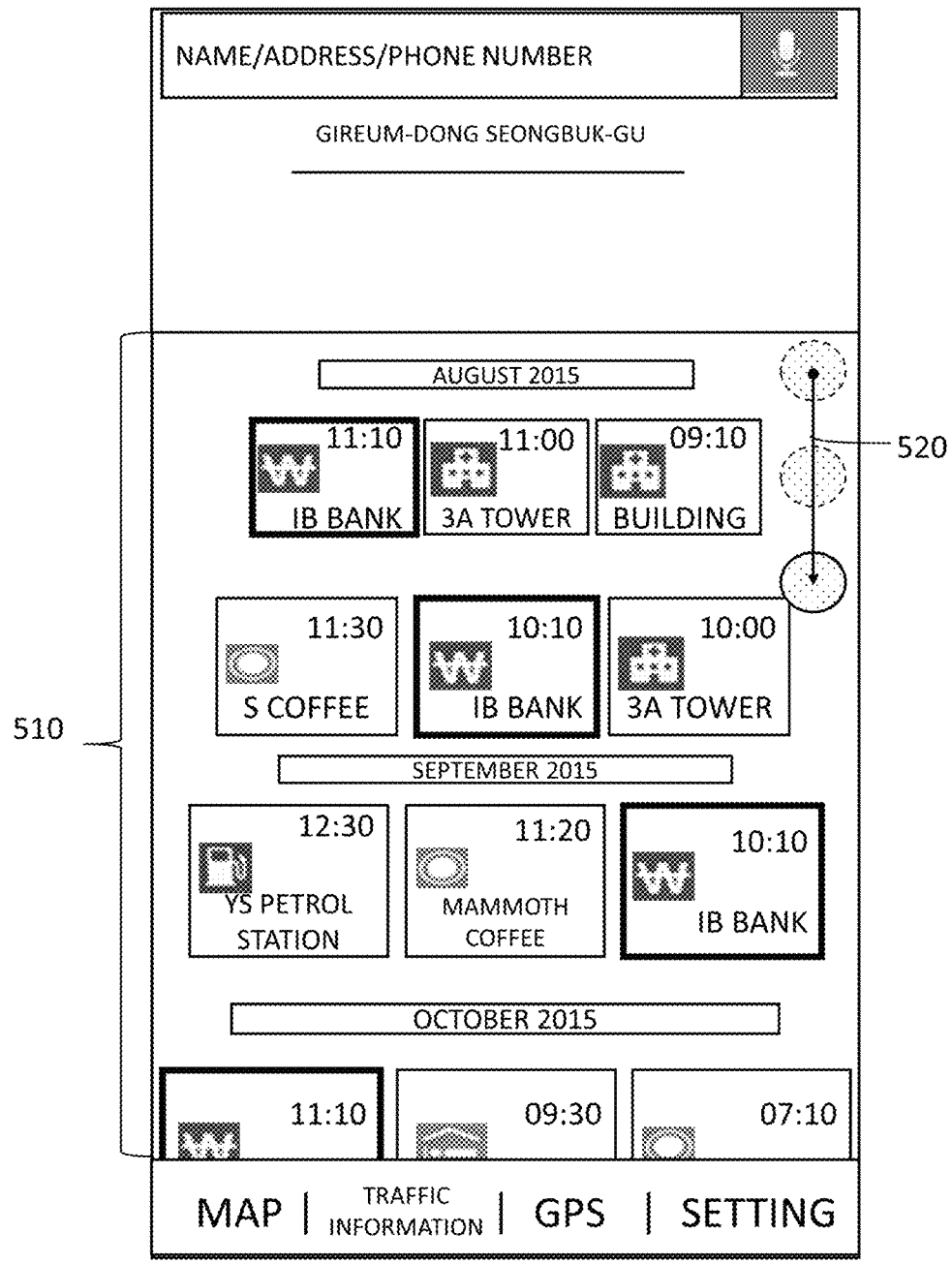

For example, when a scroll input 520 in the downward direction is received as in FIG. 5B, the objects may be moved or changed from the upward direction to the downward direction, and may be displayed. In this case, objects for the user's point of interest which is searched/visited/registered in the remote past based on a current point of time may be displayed on the display unit 131.

Figure 5C:
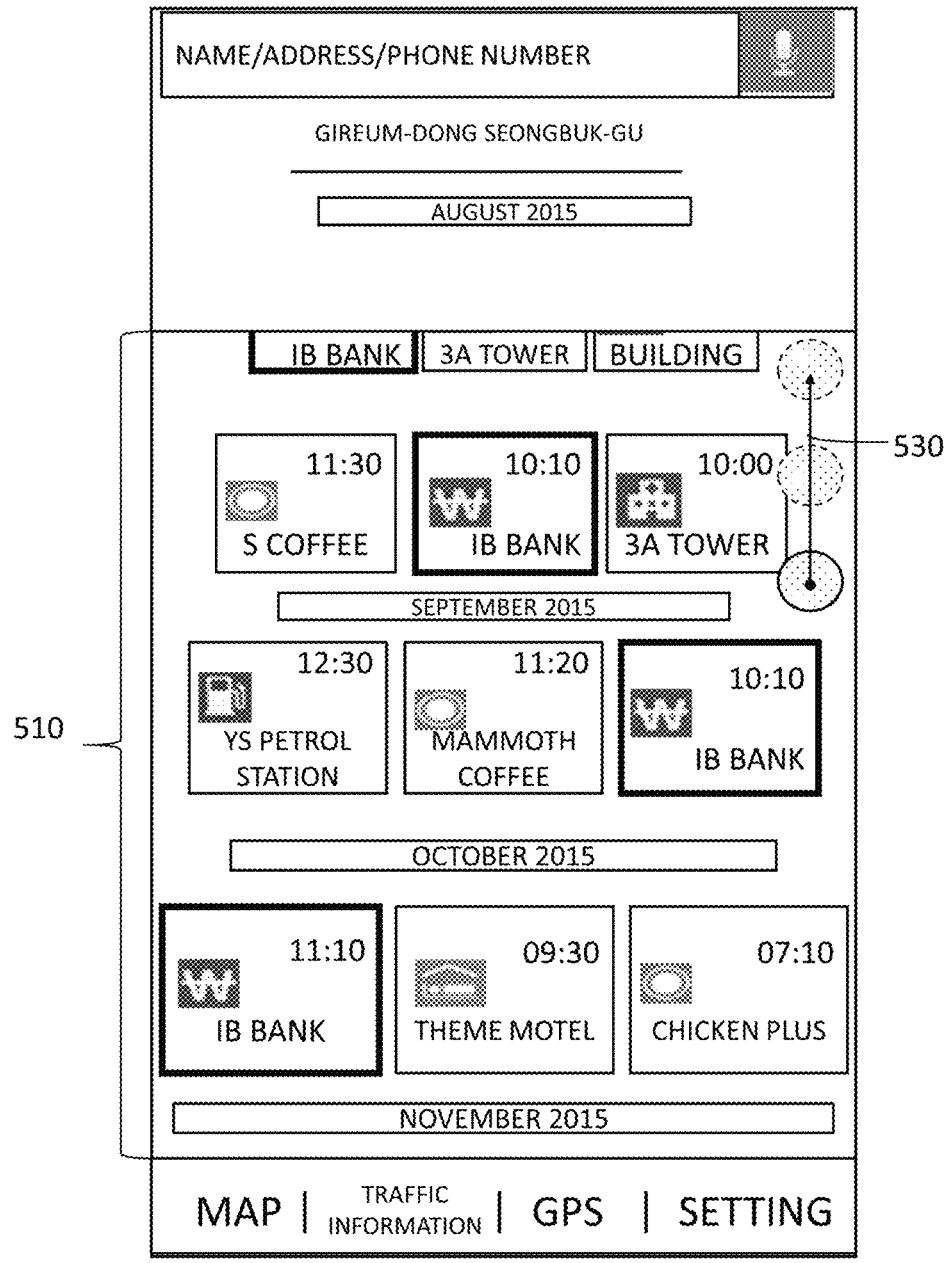

In addition, when a scroll input 530 in the upward direction is received as in FIG. 5C, the objects may be moved or changed from the downward direction to the upward direction, and may be displayed. In this case, objects for the user's point of interest which is searched/visited/registered in the recent past based on a current point of time may be displayed on the display unit 131.

If any one of the objects displayed on the UI screen is selected (S208: Yes), a detailed UI screen including at least one of detailed information of the user's point of interest corresponding to the selected object, a location view menu, a path search menu, and a deletion menu may be displayed (S209). Here, the detailed information of the user's point of interest may include information for more specifically describing the point of interest such as address information, refueling price information, and the like. The detailed UI screen may be displayed to overlap with one region of an existing UI screen which is displayed.

According to the present invention, in a situation in which a plurality of user's points of interest are set, even in the case in which only an approximate time of point of registration is remembered, even in the case in which only an approximate time of point of visit to the point of interest is remembered, and even in the case in which only the fact that the point of interest is a place to which often goes to is remembered, the user may rapidly and conveniently search for the point of interest and may edit the searched point of interest.

Figure 6:
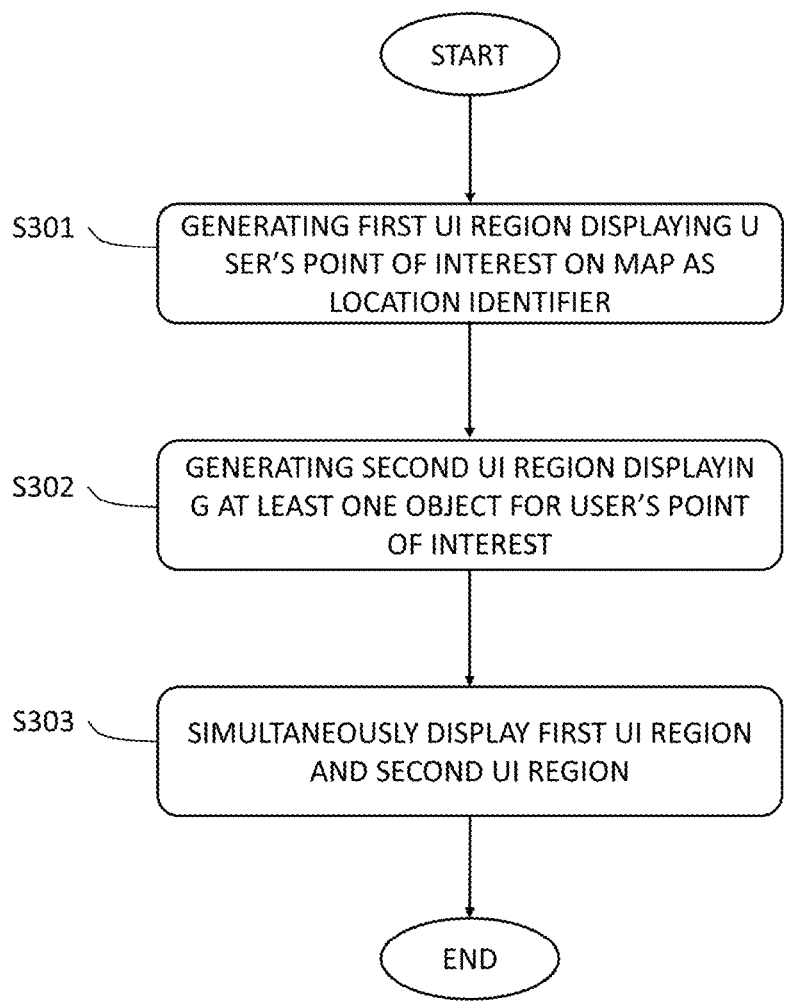
FIG. 6 is a flow chart illustrating a method for displaying a user interface (UI) screen according to a second exemplary embodiment of the present invention.

FIG. 6 is a flow chart illustrating a method for displaying a user interface (UI) screen according to a second exemplary embodiment of the present invention. First, the electronic apparatus 100 may generate a first user interface (UI) region in which the user's point of interest is displayed on the map as a location identifier (S301).

In addition, the electronic apparatus 100 may generate a second UI region in which at least one object for the user's point of interest is displayed (S302).

In addition, the electronic apparatus 100 may simultaneously display the generated first and second UI regions (S303). Here, the object displayed in the second UI region may express in detail the information regarding the user's point of interest in comparison with the location identifier displayed in the first UI region.

Figure 7:
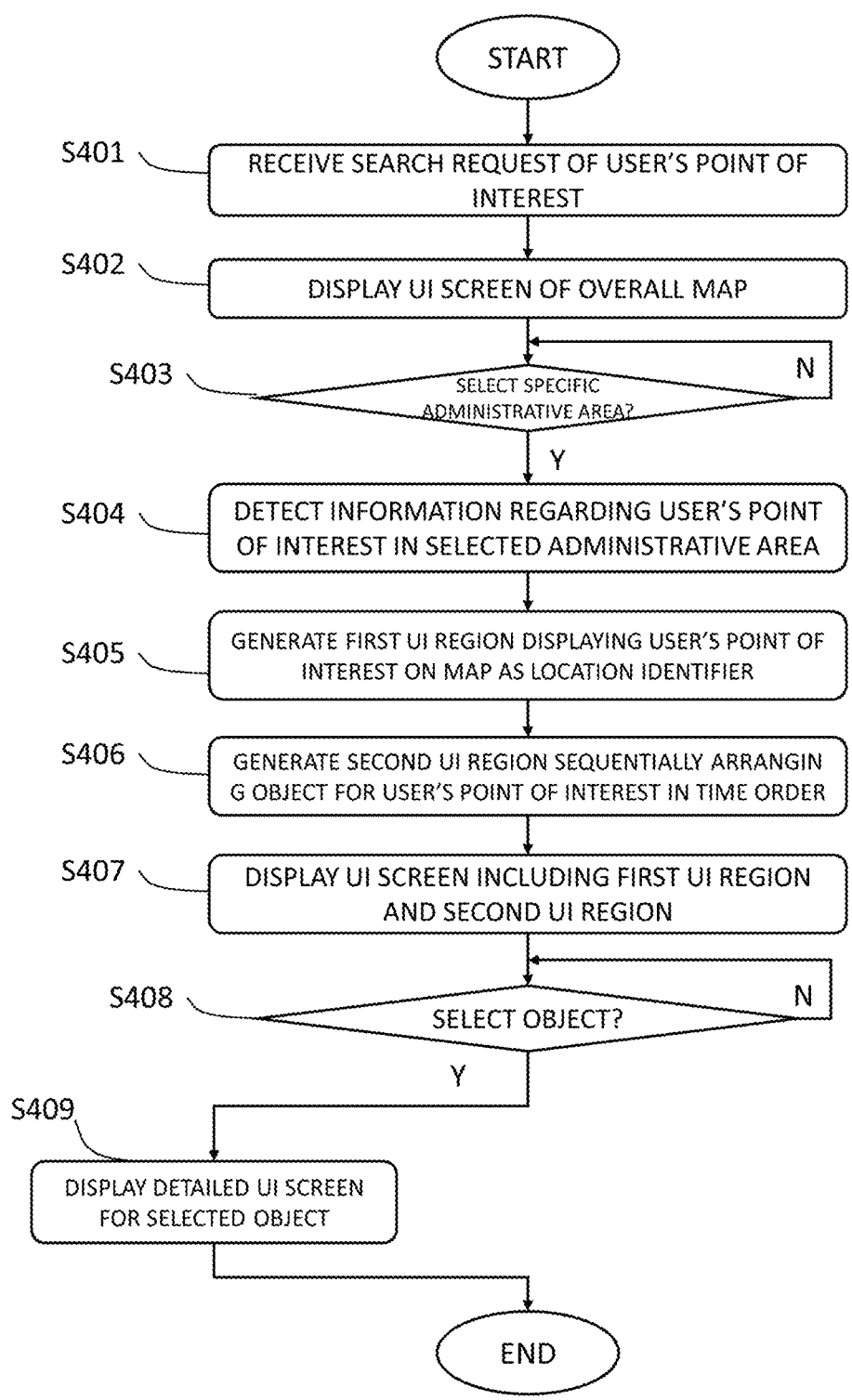
FIG. 7 is a diagram illustrating the method for displaying a user interface (UI) screen according to the second exemplary embodiment of the present invention in more detail.

FIG. 7 is a diagram illustrating the method for displaying a user interface (UI) screen according to the second exemplary embodiment of the present invention in more detail. First, the electronic apparatus 100 may receive a search request of a user's point of interest (S401).

Next, the electronic apparatus 100 may display an overall map UI screen (S402).

Figure 8A:
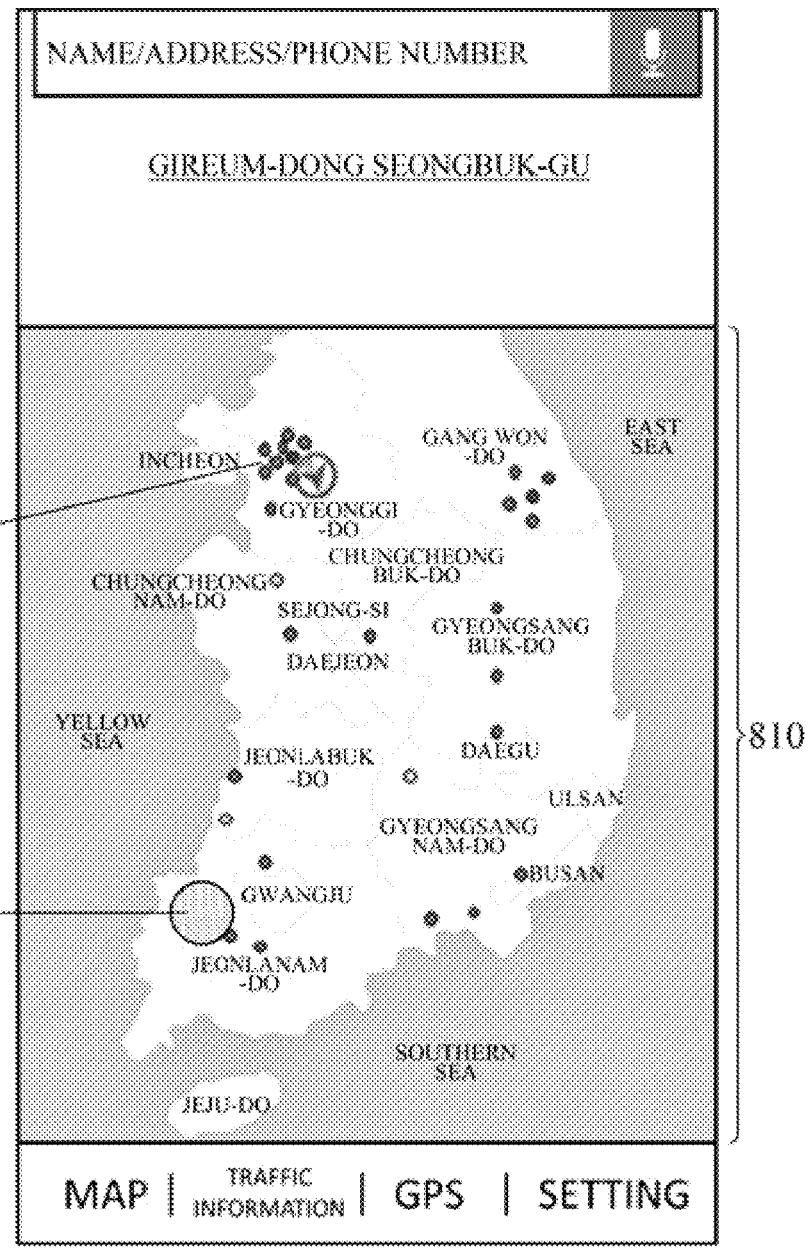
FIGS. 8A to 8B are diagrams illustrating the UI screen according to the second exemplary embodiment of the present invention.

Specifically, the overall map UI screen may be displayed as in FIG. 8A. That is, the overall map UI screen 810 may display a map including all of a plurality of administrative areas for a corresponding country.

In addition, a location identifier 811 representing a location of the user's point of interest may be displayed on the overall map. In this case, after S401, the electronic apparatus 100 may detect location information regarding the user's point of interest, and may display the user's point of interest on the overall map as the location identifier using the detected location information.

However, this is merely an exemplary embodiment of the present invention, and the location identifier may also be not displayed on the overall map UI screen unlike in FIG. 8A. Hereinafter, subsequent orders will be described with reference to the case in which the location identifier is not displayed on the overall map UI screen.

If a specific administrative area 812 among the plurality of administrative areas configuring the overall map is selected (S403: Yes), the electronic apparatus 100 may detect the information regarding the user's point of interest in the selected administrative area (S404). Specifically, the detecting unit 171 may detect at least one of time information regarding the user's point of interest, location information regarding the user's point of interest, attribute information regarding the user's point of interest, name information regarding the user's point of interest, and the number of search times information regarding the user's point of interest in the selected administrative area.

Next, the electronic apparatus 100 may generate a first UI region in which the user's point of interest is displayed on the map corresponding to the specific administrative area as a location identifier (S405). Specifically, the image processing unit 172 may generate the first UI region in which the user's point of interest is displayed on the map corresponding to the specific administrative area as the location identifier using the detected location information.

In addition, the electronic apparatus 100 may generate a second UI region in which objects for the user's point of interest are sequentially arranged along a time order (S406). Specifically, the image processing unit 172 may generate the second UI region in which the user's point of interest is displayed on the map corresponding to the specific administrative area as the location identifier using the detected time information. As an example, the image processing unit 172 may generate the second UI region by sequentially arranging the objects along the time order based on the time information.

Next, the electronic apparatus 100 may display a UI screen including the generated first and second UI regions (S407). As an example, the UI screen may be displayed as in FIG. 8B.

Figure 8B:
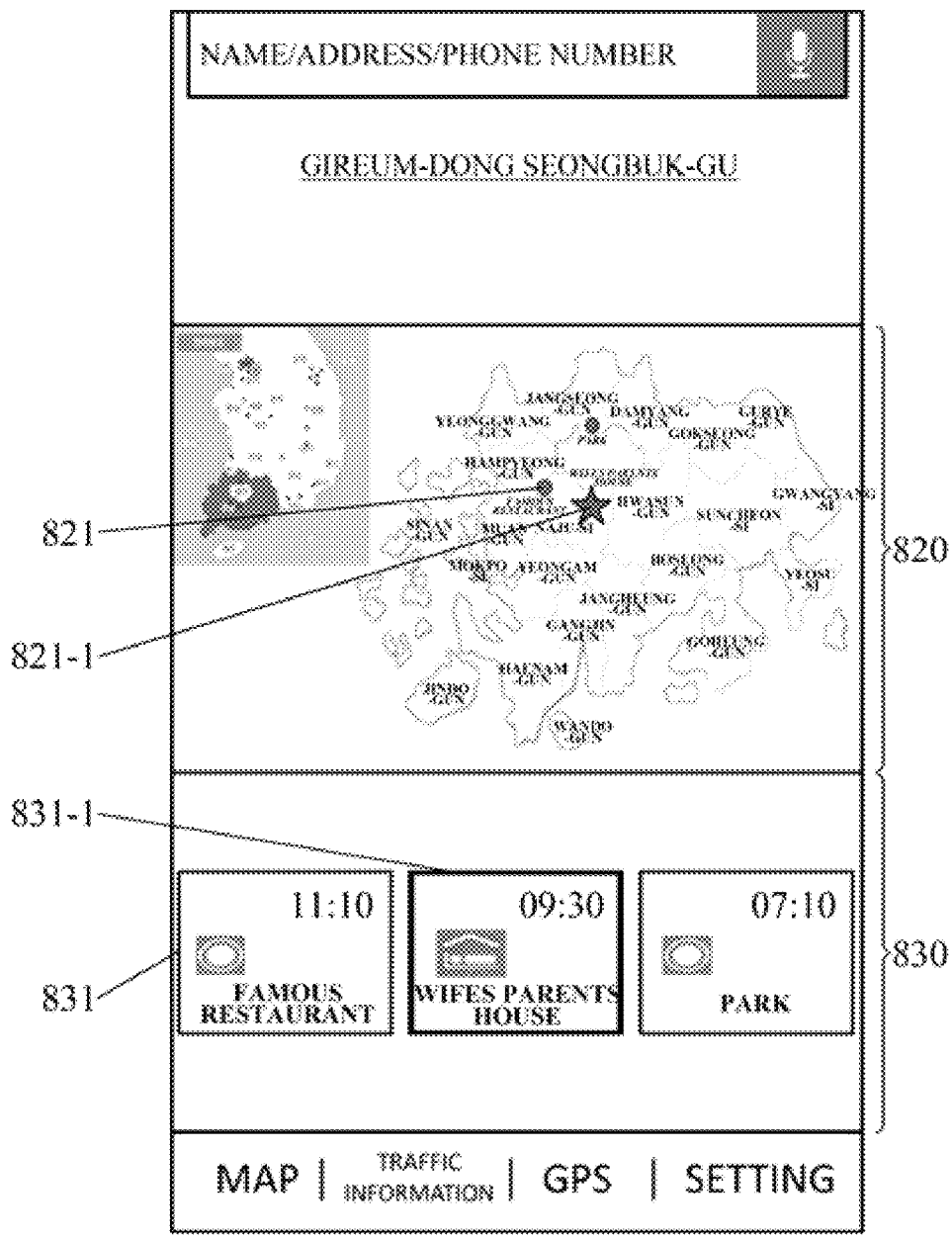

Referring to FIG. 8B, the UI screen may include a first UI region 820 in which the user's point of interest is displayed on the map corresponding to the specific administrative area as the location identifier, and a second UI region 830 in which an object for the user's point of interest is displayed.

In addition, the object 831 displayed in the second UI region 830 may express in detail the information regarding the user's point of interest in relation to the location identifier 821 displayed in the first UI region 820. For example, as in FIG. 8B, the location identifier 821 may be expressed as a point representing the corresponding location, and name information corresponding to the location identifier 821 may be additionally displayed on the map. On the contrary, the object 831 may express schematic information such as search/visit/registration time information regarding the point of interest, name information of the point of interest, attribute information of the point of interest, and the like.

In addition, the object 831 and the location identifier 821 may express the number of search times information regarding the user's point of interest. As an example, as in FIG. 8B, a location identifier 821-1 of which the number of search times for the point of interest is within the top X % may be expressed on the map as a symbol which is distinguished from other location identifiers. In addition, an object of which the number of search times for the point of interest is within the top X % may be expressed together with an edge 831-1 having a predetermined thickness.

Meanwhile, the first UI region 820 and the second UI region 830 are distinguished into separate UI regions, such that a user input to any one UI region may not influence the other UI region.

For example, when a user input for expansion or contraction is received in the first UI region 820, the first UI region 820 may expand or contract and display the map, but the second UI region 830 may not be influenced by the user input.

In addition, when a scroll input of a user is received in the second UI region 830, the second UI region 830 may scroll and display the object so as to correspond to the received scroll input, but the first UI region 820 may not be influenced by the user input.

If a scroll input of a user in a left direction is received in the second UI region 830, the objects may be moved or changed from the right to the left, and may be displayed. In this case, objects for the user's point of interest which is searched/visited/registered in the remote past based on a current point of time may be displayed in the second UI region 830.

If a scroll input of a user in a right direction is received in the second UI region 830, the objects may be moved or changed from the left to the right, and may be displayed. In this case, objects for the user's point of interest which is searched/visited/registered in the recent past based on the current point of time may be displayed in the second UI region 830.

Meanwhile, if any one of the objects displayed on the UI screen is selected (S408: Yes), the electronic apparatus 100 may display a detailed UI screen including at least one of detailed information of the user's point of interest corresponding to the selected object, a location view menu, a path search menu, and a deletion menu (S409).

According to the present invention, in a situation in which a plurality of user's points of interest are set, even in the case in which only an approximate time of point of registration is remembered, even in the case in which only an approximate time of point of visit to the point of interest is remembered, and even in the case in which only the fact that the point of interest is a place to which often goes is remembered, as well as even in the case in which only schematic location information of the point of interest is remembered, the user may rapidly and conveniently search for the point of interest and may edit the searched point of interest.

Meanwhile, although the flow charts illustrated in FIGS. 3, 4, 6, and 7 describe that the method for displaying information regarding a user's point of interest is performed along a specific order by way of example, this order is merely an illustration of the present invention, and the present invention is not limited to this order. Therefore, the order illustrated in FIGS. 3, 4, 6, and 7 may be changed depending on an implementation example.

In addition, the method for displaying information regarding a user's point of interest according to various exemplary embodiments of the present invention described above may be implemented in program codes and may be provided to a server or devices. Therefore, the respective electronic apparatuses may be connected to the server or the device in which a program is stored to download the program.

In addition, the method for displaying information regarding a user's point of interest according to various exemplary embodiments of the present invention described above may be implemented in program codes and be provided in a state in which it is stored in various non-transitory computer-readable medium.

The non-transitory computer readable medium does not mean a medium storing data for a short period such as a register, a cache, a memory, or the like, but means a machine-readable medium semi-permanently storing the data. Specifically, various applications or programs described above may be stored and provided in the non-transitory computer readable medium such as a compact disc (CD), a digital versatile disk (DVD), a hard disk, a Blu-ray disk, a universal serial bus (USB), a memory card, a read-only memory (ROM), or the like.

As described above, according to various exemplary embodiments of the present invention, in a situation in which a plurality of user's points of interest are set, even in the case in which only approximate location information of the point of interest is remembered, even in the case in which only an approximate time of point of registration is remembered, even in the case in which only an approximate time of point of visit to the point of interest is remembered, and even in the case in which only the fact that the point of interest is a place to which often goes is remembered, the user may rapidly and conveniently search for the point of interest and may edit the searched point of interest.

Although the exemplary embodiments of the present invention have been shown and described, it should be understood that the present invention is not limited to the disclosed embodiments and may be variously changed without departing from the spirit and the scope of the present invention. Accordingly, such modifications, additions and substitutions should also be understood to fall within the scope of the present invention.

What is claimed is:

1. A method for displaying a user's point of interest, the method comprising:
generating a UI (User Interface) screen including a first UI region and a second UI region;
displaying a map on the first UI region;
receiving the user's point of interest from a user;
detecting location information regarding the received user's point of interest;
displaying at least one of a plurality of location identifiers representing a location of the user's point of interest on the map by using the detected location information; and
displaying at least one of a plurality of objects on the second UI region, the plurality of objects being related to the user's point of interest displayed on the map of the first UI region,
wherein the user's point of interest includes at least two of a point previously searched by the user, a point where the user previously visited, and a point previously registered by the user as the user's point of interest,
wherein the plurality of objects displayed on the second UI region include numerical information related to the user's point of interest based on a current point of time,
wherein the plurality of location identifiers displayed on the first UI region varies depending on at least two of a visit history, a search history, and a registration history of the user,
wherein a first location identifier that meets a certain condition among the plurality of location identifiers displayed on the first UI region is displayed on the map as a symbol that is distinguished from the plurality of location identifiers, and
wherein the certain condition is number of search times.

2. The method of claim 1,
wherein the first UI region and the second UI region are separate UI regions, and a user input to the first UI region does not influence a user input to the second UI region.

3. The method of claim 2,
when a user input for expansion or contraction is received in the first UI region, the first UI region expands or contracts and displays the map.

4. The method of claim 1,
wherein one of the plurality of location identifiers is displayed using an icon representing an attribute of the user's point of interest.

5. The method of claim 2,
wherein if the user input to the second UI region is a scroll input, the second UI region on the UI screen is scrolled and displayed in a direction corresponding to a direction of the scroll input.

6. The method of claim 1, further comprising:
if any one of the plurality of location identifiers displayed on the first UI region is selected, displaying a detailed UI screen including at least one of detailed information of the user's point of interest corresponding to the selected location identifier, wherein the detailed UI screen is displayed on one area of the first UI region.

7. An electronic apparatus, comprising:
an input unit configured to receive a user's point of interest from a user; and
a processor configured to:
generate a UI (User Interface) screen including a first UI region and a second UI region,
display a map on the first UI region,
detect location information regarding the received user's point of interest,
display at least one of a plurality of location identifiers representing a location of the user's point of interest on the map by using the detected location information, and
display at least one of a plurality of objects on the second UI region, the plurality of objects being related to the user's point of interest displayed on the map of the first UI region,
wherein the user's point of interest includes at least two of a point previously searched by the user, a point where the user previously visited, and a point previously registered by the user as the user's point of interest,
wherein the plurality of objects displayed on the second UI region include numerical information related to the user's point of interest based on a current point of time,
wherein the plurality of location identifiers displayed on the first UI region varies depending on at least two of a visit history, a search history, and a registration history of the user,
wherein a first location identifier that meets a certain condition among the plurality of location identifiers displayed on the first UI region is displayed on the map as a symbol that is distinguished from the plurality of location identifiers, and
wherein the certain condition is number of search times.

8. The electronic device of claim 7,
wherein the first UI region and the second UI region are separate UI regions, and a user input to the first UI region does not influence a user input to the second UI region.

9. The electronic device of claim 8,
when a user input for expansion or contraction is received in the first UI region, the first UI region expands or contracts and displays the map.

10. The electronic device of claim 7,
wherein one of the plurality of location identifiers is displayed using an icon representing an attribute of the user's point of interest.

11. The electronic device of claim 7,
wherein the processor,
if any one of the plurality of location identifiers displayed on the first UI region is selected, displays a detailed UI screen including at least one of detailed information of the user's point of interest corresponding to the selected location identifier,
wherein the detailed UI screen is displayed on one area of the first UI region.

12. A non-transitory computer readable recording medium having a program for executing a method for displaying a user's point of interest, the method comprising:
generating a UI (User Interface) screen including a first UI region and a second UI region;
displaying a map on the first UI region;
receiving the user's point of interest from a user;
detecting location information regarding the received user's point of interest;
displaying at least one of a plurality of location identifiers representing a location of the user's point of interest on the map by using the detected location information; and
displaying at least one of a plurality of objects on the second UI region, the plurality of objections being related to the user's point of interest displayed on the map of the first UI region,
wherein the user's point of interest includes at least two of a point previously searched by the user, a point where the user previously visited, and a point previously registered by the user as the user's point of interest,
wherein the plurality of objects displayed on the second UI region include numerical information related to the user's point of interest based on a current point of time,
wherein the plurality of location identifiers displayed on the first UI region varies depending on at least two of a visit history, a search history, and a registration history of the user,
wherein a first location identifier that meets a certain condition among the plurality of location identifiers displayed on the first UI region is displayed on the map as a symbol that is distinguished from the plurality of location identifiers, and
wherein the certain condition is number of search times.

* * * * *